US008204156B2

(12) United States Patent
Hewavithana et al.

(10) Patent No.: US 8,204,156 B2
(45) Date of Patent: Jun. 19, 2012

(54) PHASE ERROR DETECTION WITH CONDITIONAL PROBABILITIES

(75) Inventors: Thushara Hewavithana, Borehamwood (GB); Bernard Arambepola, Middlesex (GB); Parveen K. Shukla, Nottingham (GB); Sahan S. Gamage, Cambridge (GB); Vinesh Bhunjun, Potters Bar (GB)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 12/317,970

(22) Filed: Dec. 31, 2008

(65) Prior Publication Data

US 2010/0166115 A1 Jul. 1, 2010

(51) Int. Cl.
*H04L 27/00* (2006.01)
*H03D 3/22* (2006.01)

(52) U.S. Cl. ........................................ 375/324; 375/329
(58) Field of Classification Search .................. 375/316, 375/322, 324, 326, 329, 332, 333, 340, 346, 375/348, 354, 371
See application file for complete search history.

(56) References Cited

U.S. PATENT DOCUMENTS

| 4,253,184 | A | 2/1981 | Gitlin et al. |
| 4,879,728 | A | 11/1989 | Tarallo |
| 4,943,982 | A | 7/1990 | O'Neil et al. |
| 5,157,694 | A | 10/1992 | Iwasaki et al. |
| 5,268,761 | A | 12/1993 | White |
| 5,341,135 | A | 8/1994 | Pearce |
| 5,379,323 | A | 1/1995 | Nakaya |
| 5,386,239 | A | 1/1995 | Wang et al. |
| 5,400,366 | A | 3/1995 | Iwamatsu |
| 5,574,454 | A | 11/1996 | Wilson et al. |
| 5,579,346 | A | 11/1996 | Kanzaki |
| 5,878,088 | A | 3/1999 | Knutson et al. |
| 6,134,430 | A | 10/2000 | Younis et al. |
| 6,285,655 | B1 | 9/2001 | Lundby et al. |
| 6,307,898 | B1 | 10/2001 | Ido |
| 6,341,123 | B1 | 1/2002 | Tsujishita et al. |
| 6,385,633 | B1 | 5/2002 | Schmidl |
| 6,519,303 | B1 | 2/2003 | Matsuda et al. |
| 6,567,833 | B2 | 5/2003 | Van Wechel |

(Continued)

FOREIGN PATENT DOCUMENTS

WO    WO-2003/017605 A1    3/2003

(Continued)

OTHER PUBLICATIONS

International Search Report and Written Opinion received for PCT Application No. PCT/US2009/069508, mailed on Jul. 28, 2010, 9 pages.

*Primary Examiner* — David C. Payne
*Assistant Examiner* — Vineeta Panwalkar
(74) *Attorney, Agent, or Firm* — Schubert Law Group PLLC (57) ABSTRACT

Apparatuses, systems, and methods that employ conditional probabilities to calculate phase errors are disclosed. For a received signal, the embodiments may develop several phase error estimates relative to each point of a constellation, the number and location of points of the constellation depending on the modulation technique of the received signal. In addition to calculating the phase error estimates, the embodiments may also calculate weights, or probabilities, associated with each of the estimates. The embodiments may use the estimates and the weights to calculate a composite phase error estimate. The composite phase error estimate may be used to correct the received signal and eliminate or reduce the impact of the phase error.

25 Claims, 7 Drawing Sheets

U.S. PATENT DOCUMENTS

| | | |
|---|---|---|
| 6,643,678 B2 | 11/2003 | Van Wechel et al. |
| 7,046,743 B2 | 5/2006 | Akahori |
| 7,092,429 B1 | 8/2006 | McKenney |
| 7,099,639 B2 | 8/2006 | Akahori |
| 7,136,455 B2 | 11/2006 | Dunham et al. |
| 7,185,038 B2 | 2/2007 | Van Wechel et al. |
| 7,277,502 B2 | 10/2007 | Hayashi et al. |
| 7,376,206 B1 | 5/2008 | Simic et al. |
| 7,460,832 B2 | 12/2008 | Lee et al. |
| 7,643,578 B2 * | 1/2010 | Hoo et al. ............... 375/322 |
| 2002/0034266 A1 | 3/2002 | Akahori |
| 2002/0123582 A1 | 9/2002 | Speca |
| 2002/0141506 A1 | 10/2002 | Chen |
| 2002/0176483 A1 | 11/2002 | Crawford |
| 2003/0016767 A1 | 1/2003 | Houtman |
| 2003/0232606 A1 | 12/2003 | Akahori |
| 2005/0213678 A1 * | 9/2005 | Lewis ............... 375/260 |
| 2006/0067439 A1 | 3/2006 | Kishibe |
| 2007/0206638 A1 | 9/2007 | Santoru et al. |
| 2008/0152056 A1 | 6/2008 | Watanabe |

FOREIGN PATENT DOCUMENTS

| | | |
|---|---|---|
| WO | 2007/071193 A1 | 6/2007 |
| WO | 2010/078213 A2 | 7/2010 |
| WO | 2010/078213 A3 | 7/2010 |

* cited by examiner

|  | QPSK Code Rate 1/2 @ 1.0 dB | 8PSK Code Rate 2/3 @ 6.6 dB |
|---|---|---|
| Decision-Directed PED (Equation (1)) | -6.3 dB | -6.7 dB |
| Non-Decision-Aided PED (Equation (2)) | -5.7 dB | -5.4 dB (*see Note 1, Paragraph [0077]) |
| Embodiment PED (Equation (10)) | -4.4 dB | -4.3 dB |

PHASE ERROR DETECTION WITH CONDITIONAL PROBABILITIES

FIELD

The embodiments herein are in the field of communications. More particularly, the embodiments relate to methods and apparatuses to detect phase errors for a communications receiving device via conditional probability.

BACKGROUND

In a typical radio frequency (RF) communications system, data may be processed at a transmitter device, modulated, filtered, amplified, and transmitted to one or more receiver devices. The transmitted signal typically experiences path loss, multipath interference, and other types of signal degradation before reaching the receiver devices. A receiver device receives the modulated signal, performs various types of conditioning, and demodulates the conditioned signal to recover the transmitted data. The signal conditioning typically includes low noise amplification, filtering, automatic gain control, frequency down-conversion, sampling, quantization, and so on.

Modern communication systems employ a variety of different modulation techniques to transfer data. For example, phase shift keying (PSK) is one common technique used to modulate a carrier with a multi-valued digital signal whereby digital values are represented by predetermined phases of the carrier signal. An M-ary phase shift keying arrangement such as quaternary phase shift keying (QPSK) may use the phases $\pi/4$, $3\pi/4$, $5\pi/4$ and $7\pi/4$ in a phase plane representation to represent symbols comprising pairs of digital values or dibits. A demodulator receiving the PSK signal generally includes an oscillator operating at the same frequency and phase as the transmitted signal. To properly distinguish between symbol phases in the PSK signal at a receiver, the phase of the carrier source in the demodulator is set to that of the received signal.

When a signal is transmitted over a radio channel such as in mobile radio or satellite systems, interference of the transmission medium often subject the signal to severe variations in phase and amplitude. Due to path loss, multipath interference, and the other types of interferences, the received signal level typically varies over a wide range of values. For example, in some systems the received signal level may vary in excess of 90 dB. Consequently, the communication receiving devices require automatic frequency and phase control to maintain synchronization between the received signal carrier and the demodulator oscillator. The phases of the received signals are maintained at acceptable levels by proper design of receiver circuits, such as by the use of phase error detection circuits. Currently available phase error detectors generally fall into two categories: decision-directed phase detectors and non-decision-aided phase detectors.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Generally speaking, apparatuses, systems, methods, and computer program products stored in tangible mediums that employ conditional probabilities to calculate phase errors are contemplated. For a received signal, the embodiments may develop several phase error estimates relative to each point of a constellation, the number and location of points of the constellation depending on the modulation technique of the received signal. In addition to calculating the phase error estimates, the embodiments may also calculate weights, or probabilities, associated with each of the estimates. The embodiments may use the estimates and the weights to calculate a composite phase error estimate. The composite phase error estimate may be used to correct the received signal and eliminate or reduce the impact of the phase error.

Method embodiments generally comprise calculating a number of estimates for an input signal, with the estimates for a constellation of points. The embodiments may calculate a number of weights of conditional probabilities and multiply the individual estimates and with the individual weights to produce a plurality of weighted estimates. The embodiments may further determine a composite estimate of phase error by dividing the sum of the plurality of weights by the sum of the weights.

An apparatus embodiment may comprise an estimator, a probability determiner, and an error calculator. The estimator may determine estimates of phase error for an input signal, with the estimates being referenced to a constellation of points. The probability determiner may determine weights of probabilities for the estimates of phase error. The error calculator may calculate a composite error of phase for the input signal based on the estimates of phase error and the weights of probabilities.

A system embodiment may comprise a tuner, a demodulator, and a phase error detector. The tuner may generate in-phase and quadrature-phase components for an input signal, with the demodulator being arranged to demodulate the input signal. The phase error detector may detect a composite error of phase of the input signal with reference to a constellation of points. The composite error may comprise a quotient of a numerator and a denominator, with the numerator comprising a first sum of products of estimates of phase error and weights of probabilities associated with the estimates. The denominator may comprise a second sum of the weights of probabilities.

Numerous embodiments may comprise a machine-accessible medium containing instructions, which when executed by a machine, cause the machine to perform operations for computing phase error. The instructions may be for computing a plurality of estimates of phase error for an input signal, wherein the plurality of estimates is for a constellation of points. The instructions may further be for computing a plurality of weights of conditional probabilities that correspond to the estimates of phase error and multiplying individual estimates of phase error with individual weights to produce a plurality of weighted estimates. The instructions may further be for dividing the plurality of weighted estimates by a sum of the plurality of weights to determine a composite estimate of phase error.

Some embodiments described herein describe detecting and/or correcting phase errors associated with QPSK. Other embodiments describe detecting and/or correcting phase errors associated with 8-phse PSK (8PSK). Those possessing ordinary skill in the art will appreciate that even though the embodiments described herein may specifically refer to QPSK and 8PSK, alternative embodiments may detect and/or correct phase errors associated other types of modulation techniques. For example, just to name a few of the alternative modulation techniques, alternative embodiments may detect/correct phase errors associated with binary PSK (BPSK), 16PSK, differential PSK, differential offset PSK, offset QPSK, continuous phase modulation (CPM), minimum-shift key (MSK), and Gaussian minimum-shift keying (GMSK). Further embodiments may use a modulation technique that combines different modulation methods, such as a technique that combines frequency modulation and phase modulation.

Figure 1:
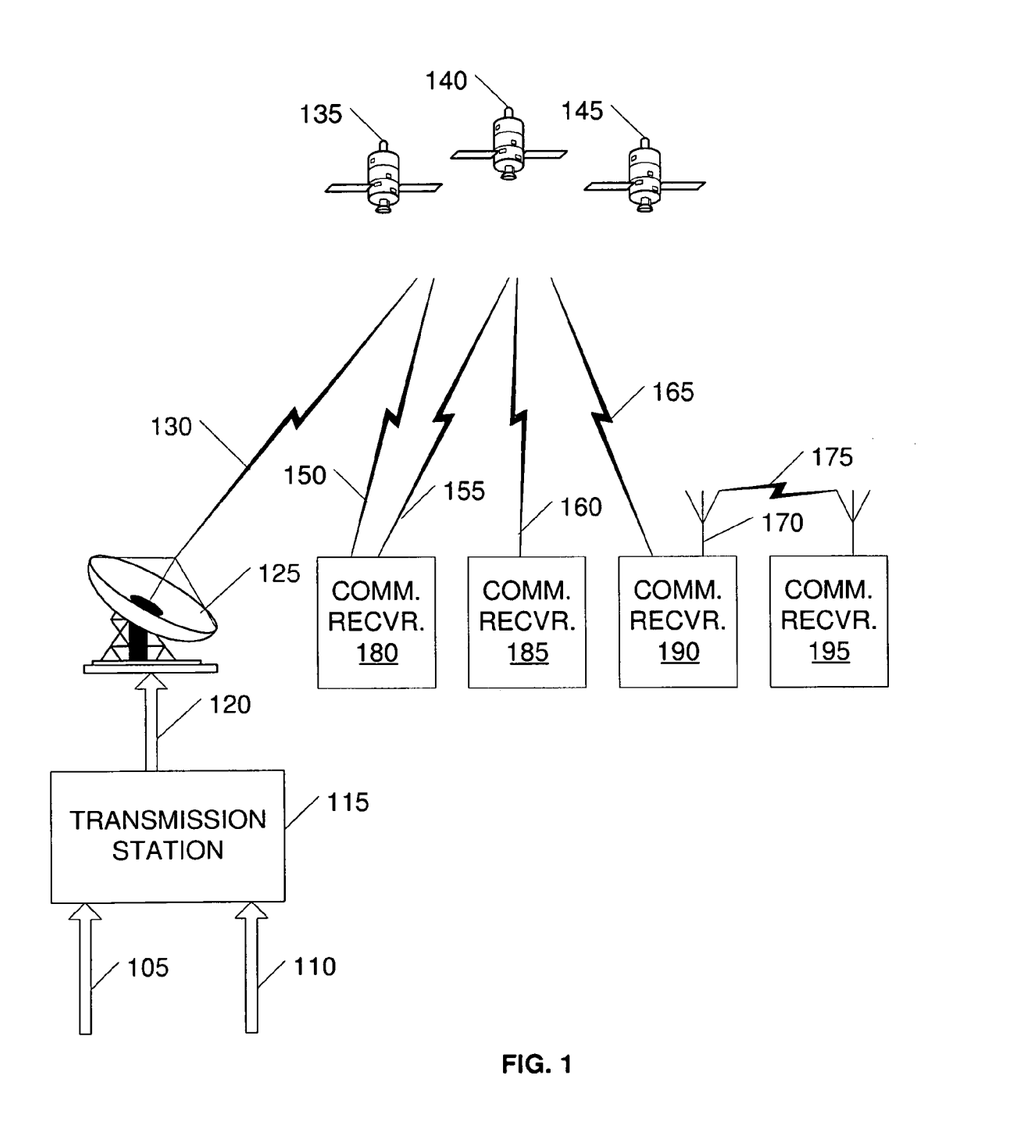
FIG. 1 illustrates how a communication system may employ conditional probability to detect phase errors in numerous communication receiving devices.

Turning now to the drawings, FIG. 1 illustrates how a communication system, such as a television broadcasting system 100, may employ conditional probability to detect phase errors in numerous communication receiving devices, or receivers. Television broadcasting system 100 may transmit and receive audio, video, and data signals via satellite. Although the embodiments of FIG. 1 are described in the context of a satellite-based television broadcasting system 100, the techniques described are also applicable to other systems and apparatuses that receive signal transmissions, such as terrestrial over-the-air systems. Further, while many embodiments are described primarily with respect to television content (i.e. audio and video content), alternative embodiments may be used with a wide variety of program content material, including video content, audio content, audio and video related content (e.g., television viewer channels), or data content (e.g., computer data).

Television broadcasting system 100 may include transmission station 115, uplink dish 125, one or more satellites (135, 140, and 145), and one or more communication receivers (180, 185, 190, and 195). Transmission station 115 may have a plurality of inputs 105 for receiving various signals, such as analog television signals, digital television signals, video tape signals, original programming signals, and computer generated signals containing hypertext markup language (HTML) content or binary data. For example, inputs 105 may receive signals from digital video servers having hard discs or other digital storage media.

Transmission station 115 may also include a plurality of timing inputs 110 that provide electronic schedule information about the timing and content of various television channels, such as information found in television schedules contained in newspapers, television guides, and on-screen electronic program guides. For example, transmission station 115 may convert the data from timing inputs 110 into program guide data. Upon transmission via transmission station 115, the program guide data may be displayed on televisions or monitors coupled with one or more of receivers 180, 185, 190, and 195.

Transmission station 115 may receive and process the various input signals received via inputs 105 and timing inputs 110, convert the received signals into a standard form, combine the standard signals into one or more output data streams, such as output data stream 120, and continuously send the output data streams to uplink dish 125. For example transmission station 115 may generate data stream 120, which may comprise a digital data stream compressed using moving picture experts group (MPEG-2) encoding. Other output data streams of transmission station 115 may employ another compression scheme, such as MPEG-4 or another scheme. Even further output data streams may employ no compression and/or encoding schemes.

In generating output data stream 120, transmission station 115 may employ one or more of a variety of different modulation techniques. For example, in one embodiment, transmission station 115 may generate data stream 120 using quadrature amplitude modulation (QAM). In another embodiment, transmission station 115 may generate data stream 120 using 8PSK. In other words, different embodiments may use one or more different modulation techniques to transmit digital and/or analog data.

The digital data in output data stream 120 may be divided into a plurality of packets, with the packets comprising various types of data. For example, the packets may contain information used by a communication receiver device to identify the packets that correspond to a specific television channel. The packets, or other transmitted bits of the output data stream, may also contain error correction data to ensure the transmitted data is correctly decoded or otherwise processed in the communication receiver device. The packet data of some embodiments may also include data to help correct phase errors. Such embodiments may employ the phase error packet data to supplement or complement the detection and/or correction of phase errors via conditional probabilities.

Output data stream 120 may comprise a multiplexed signal that is modulated by transmission station 115 using one or more frequency and polarization modulation techniques. Output data stream 120 may include a plurality of frequency bands, such as sixteen frequency bands, with each frequency band being either left-polarized or right-polarized. Alternatively, in alternative embodiments, vertical and horizontal polarizations may be used.

Uplink dish 125 may continuously receive output data stream 120 from transmission station 115, amplify the received signals, and transmit signals 130 to at least one of satellites 135, 140, and 145. Although a single uplink dish 125 and three satellites (135, 140, and 145) are shown in FIG. 1, multiple uplink dishes 125 and a larger number of satellites may be used in alternative embodiments to provide additional bandwidth and to help ensure continuous delivery of signals 130 to receivers 180, 185, 190, and 195.

Satellites 135, 140, and 145 may revolve in geosynchronous orbit about the earth. Some of satellites 135, 140, and 145 may operate passively, reflecting received signals 130 without any modification, while some of satellites 135, 140, and 145 may operate actively. For example, satellite 145 may include a plurality of transponders that receives signals 130 transmitted by uplink dish 125, amplify the received signals 130, frequency shift the received signals 130 to different frequency bands, and then transmit the amplified frequency-shifted signals 165 back to geographic areas on the Earth, such as to one of receivers 180, 185, and 190. Each of satellites 135, 140, and 145 that operate actively may employ conditional probabilities to detect and correct phase errors associated with signals 130.

Communication receivers 180, 185, and 190 may receive and process signals 150, 160, and 165 transmitted by satellites 135, 140, and 145. In the process of receiving and processing signals 150, 160, and 165, receivers 180, 185, and 190 may each employ phase detection and phase error correction using conditional probabilities.

Satellite 140 may broadcast signals 160 in thirty-two (32) different frequencies, which are licensed to various users for broadcasting of programming, which may be audio, video, or data signals, or any combination. In some embodiments, signals 150 may be located in the Ku-band of frequencies, i.e., 11-18 gigahertz (GHz). In alternative embodiments, signals 150 may be located in the Ka-band of frequencies, i.e., 18-40 GHz. Even further embodiments may use one or more other frequency bands, such as the C-band, X-band, K-band, or L-band, as examples. Receivers 180, 185, 190, and 195 may employ the phase error detection and/or correction techniques disclosed for different frequencies of the different bands.

FIG. 1 illustrates how receiver 180 may receive transmitted signals 150 and transmit signals 155 back to satellite 140. For example, receiver 180 may comprise a receiver of an Earth repeater station used to propagate signals 130 from one continent to another. Uplink dish 125 may reside in one country and transmit signals 130 to satellite 135. Satellite 135 may operate passively and simply transmit signals 150 back to receiver 180. Receiver 180 may perform phase error correction using conditional probabilities and retransmit the corrected signals 155 back to satellite 140. Satellite 140 may receive signals 155 and retransmit the received signals back down to receiver 185 via signals 160, with receiver 185 being located in another country. Upon receiving signals 160, receiver 185 may also detect and correct phase errors of signals 160 using conditional probabilities.

Also as illustrated in FIG. 1, receiver 190 may receive signals 165 from satellite 145 and retransmit the signals to receiver 195. For example, receiver 190 may comprise a receiver of a television station for a certain geographic location. The television station may broadcast the feeds or signals 165 to residents of the location via antenna 170. For example, a resident may have a set-top box comprising receiver 195 that receives signals 175. Receiver 195 may correct phase errors of signals 175 using conditional probabilities and reconstruct video and audio from the corrected signals for a television coupled to receiver 195. In some embodiments, transmitted signals 175 may comprise UHF or VHF frequencies. In alternative embodiments, signals 175 may comprise frequencies of another band, such as a band of microwave frequencies, ranging somewhere between 300 megahertz (MHz) and 300 GHz.

Figure 2:
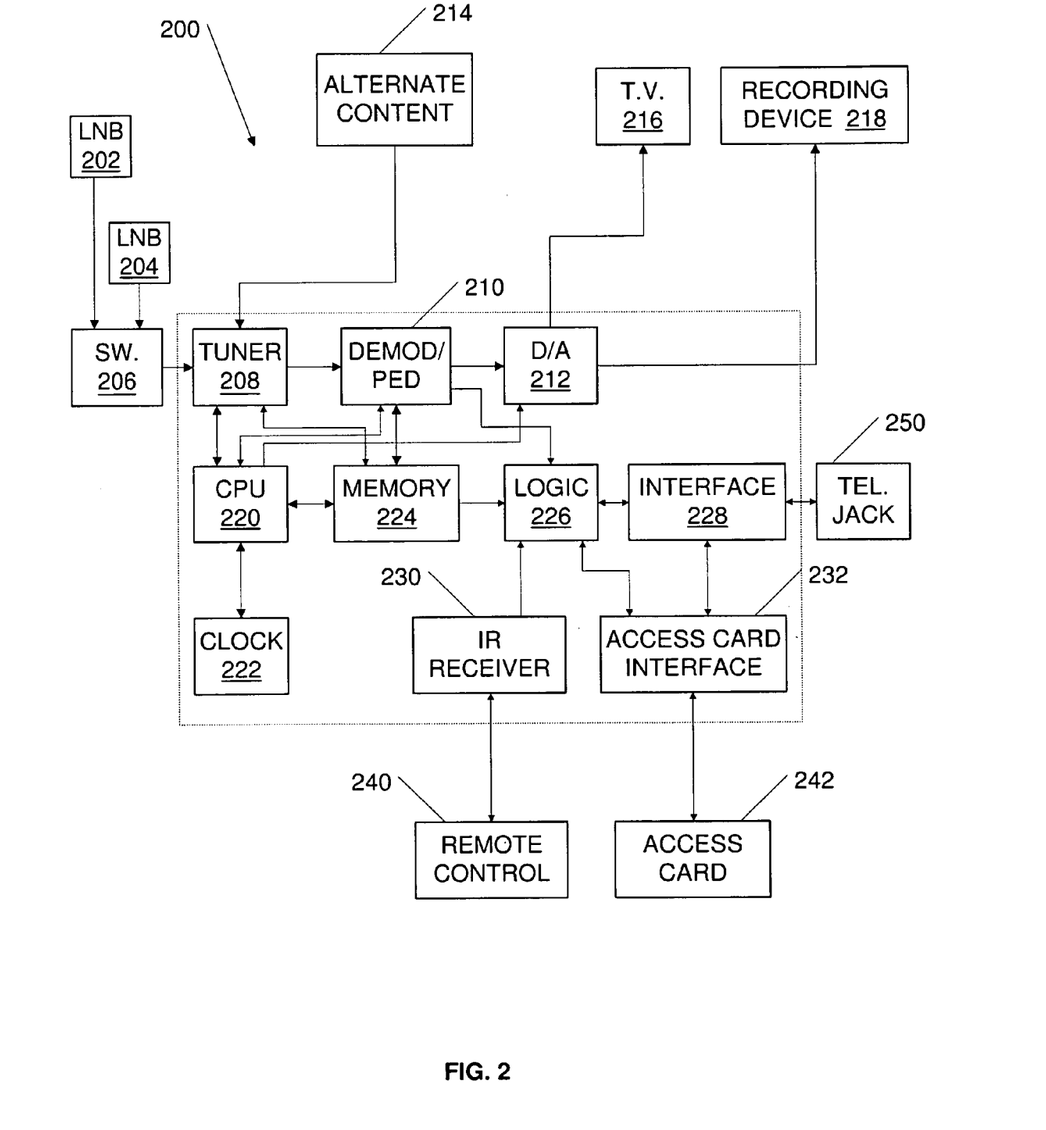
FIG. 2 illustrates an embodiment of a receiver that may perform error correction using conditional probabilities.

FIG. 2 illustrates an embodiment of a communications receiving device, receiver 200, which may perform error correction using conditional probabilities. For example, receiver 200 may comprise a satellite receiver system of a customer, such as receiver 185, used to receive and descramble programming content from a satellite programming provider, such as DirecTV®, Dish Network®, or National Programming Service, Inc.

Receiver 200 may receive and decode audio, video, and data signals, such as digital video broadcasting (DVB) signals. For example, receiver 200 may comprise a set-top box, also known as an Integrated Receiver Decoder (IRD), in a home or multi-dwelling unit. Receiver 200 may also be a Personal Video Recorder (PVR) which may record signals via recording device 218 for playback at a later date.

Receiver 200 may employ a switch 206 to select between a first low noise block down-converter (LNB) 202 and a second LNB 204. LNB 202 may receive signals from one satellite, while LNB 204 receives signals from a second satellite. Receiver 200 may also be coupled to alternate content source 214, television 216, remote control 240, and access card 242. For example, in addition to receiving digital satellite signals, receiver 200 may also perform phase error correction via conditional probabilities for other sources of television content. As a specific example, alternate content source 214 may provide additional television content for television 216, such as a broadcast terrestrial UHF signal. As depicted in FIG. 2, alternate content source 214 may be transferred to tuner 208. Although only one alternate content source 214 is shown, multiple sources may be used in alternative embodiments.

Receiver 200 may include tuner 208 and demodulator/ phase error detector (PED) 210, digital-to-analog (D/A) converter 212, central processing unit (CPU) 220, clock 222, memory 224, logic circuit 226, interface 228, infrared (IR) receiver 230, and access card interface 232. Receiver 200 may receive signals sent by satellites, amplify the signals, and pass the signals to tuner 208. In other words, receiver 200 may include filters and amplifier circuits between switch 206 and tuner 208.

Tuner 208 and demodulator/PED 210 may operate under control of CPU 220. That is to say, for the embodiment of receiver 200 depicted in FIG. 2, CPU 220 may control the operation of phase error detection and phase error correction. However, in many alternative embodiments, the phase error detection and phase error correction may be carried out or processed independently of any central processing unit, such as by a dedicated circuit and/or chip, such as an application specific integrated circuit (ASIC), as an example.

In the embodiment of FIG. 2, CPU 220 operates under the control of an operating system stored in the memory 224. The functions performed by CPU 220 may be controlled by one or more control programs or applications stored in memory 224. The operating system and applications comprise instructions which, when read and executed by the CPU 220, cause receiver 200 to perform the functions and steps necessary to implement and/or use phase error correction via conditional probabilities, typically, by accessing and manipulating data stored in the memory 224. Instructions implementing such applications are tangibly embodied in a computer-readable medium, such as memory 224 or access card 242.

CPU 220 may also communicate with other devices through interface 228, LNB 202, or LNB 204 to accept commands or instructions to be stored in the memory 224, thereby making a computer program product or article of manufacture according to the invention. For example, upgraded instructions may be downloaded to receiver 200 which alter or change the manner in which receiver implements phase error correction, such as by changing a specific calculation method to speed phase error correction of 32 PSK signals. As such, the terms "article of manufacture," "program storage device" and "computer program product" as used herein may encompass an application accessible by the CPU 220 from a computer readable device or media.

Clock 222 may provide the current local time to CPU 220. Interface 228 may be coupled to a telephone jack 250 at the site of receiver 200. For example, interface 228 may allow receiver 200 to communicate with transmission station 115 shown in FIG. 1 via telephone jack 250. Interface 228 may also be used to transfer data to and from a network, such as the Internet. In at least one embodiment, a manufacturer of receiver 200 may upgrade demodulator/PED 210 with programming data transferred via interface 228. For example, in an alternative embodiment, telephone jack 250 may comprise an Ethernet jack coupled to the Internet.

The signals sent to receiver 200 and tuner 208 may comprise a plurality of modulated RF signals. Receiver 200 may then convert a specific RF signal to baseband via tuner 208, which may generate in-phase and quadrature-phase ("I" and "Q") components for the RF signal. For example, a transmitted data symbol may be represented by both "I" and "Q" quadrature components which represent quadrature phased carriers at a given frequency. Each symbol may comprise several bits, and the number of bits/symbol may dictate the type of modulation, e.g., 16-QAM, 32-QPSK, etc.

Each symbol may be mapped to a prescribed coordinate in a four-quadrant grid-like constellation using a look-up table, such as a table in read only memory. Depending on the modulation technique, a prescribed number of symbols may occupy assigned areas in each quadrant. For example, in a 32-QAM system, each quadrant of the constellation contains eight symbols at prescribed coordinates with respect to quadrature I and Q axes. Certain symbol bits may designate the constellation quadrant in which a symbol is located, while other bits may designate the particular coordinate in the quadrant assigned to the symbol.

Receiver 200 may pass the two signal components, I and Q, to demodulator/PED 210. Demodulator/PED 210 ASIC may then demodulate the I and Q signal components, employing conditional probabilities to correct phase errors. The received symbols for QPSK or 8PSK signals carry two or three data bits, respectively. Upon correcting for phase errors, receiver 200 may then develop symbols from the demodulated and phase-corrected, translate the symbols into data bits, and assemble the data bits into payload data bytes and ultimately into data packets. For example, the data packets may carry 130 data bytes or 188 bytes (187 data bytes and 1 sync byte). Receiver 200 may continuously assemble the data bytes to generate audio and video outputs for a user.

When a user selects a channel using remote control 240, IR receiver 230 may relay the selection to logic circuit 226, which passes the selection to memory 224 where the selection may be accessed by CPU 220. CPU 220 may perform MPEG2/MPEG4 decoding for the audio/video of demodulator/PED 210 and generate the audio and video signals for the selected channel to D/A converter 212. D/A converter 212 may convert the digital signals to analog signals and pass the analog signals to television 216. In some alternative embodiments, television 216 may comprise a digital television, in which case no digital to analog conversion in receiver 200 may be necessary. In other words, an alternate form of receiver 200 may include no D/A converter 212.

Figure 3A:
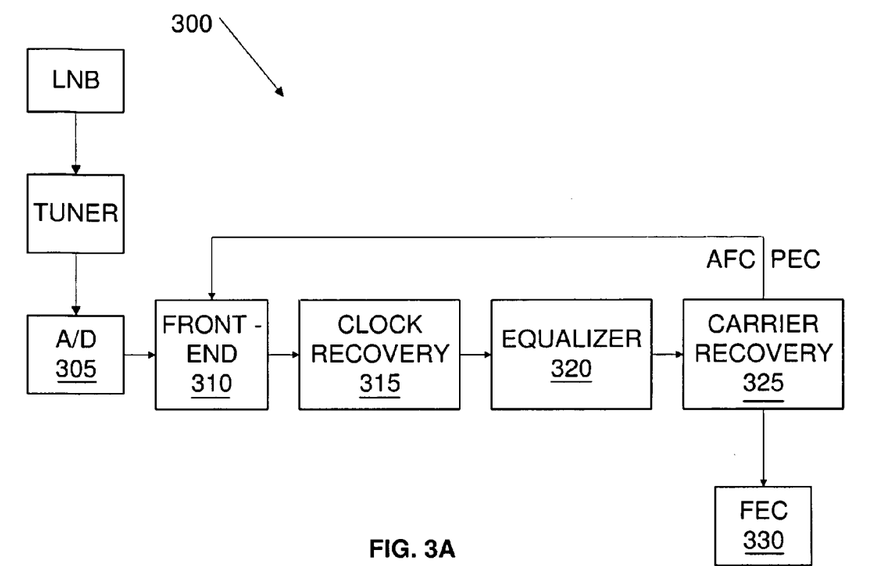
FIG. 3A depicts the architecture of a demodulator

To illustrate in greater detail how a receiver or other apparatus may perform phase error correction using conditional probabilities, we turn now to FIG. 3A. FIG. 3A depicts the architecture of a demodulator 300. Demodulator 300 may demodulate QPSK modulated signals in some embodiments and 8PSK modulated signals in other embodiments. Further, in additional embodiments, demodulator 300 may demodulate signals modulated via other techniques, such as APSK or QAM.

Analog-to-digital (A/D) converter 305 may receive baseband signals I and Q from a tuner, e.g., tuner 208. A/D converter 305 may convert baseband signal components I and Q into digital signals and transfer the converted baseband signals to front-end 310, which may comprise gain control and filtering circuits. Clock recovery 315 may comprise circuits that reproduce a sampling clock signal from the output of front-end 310, depending on detection of zero crossings based on the modulation technique. Equalizer 320 may comprise a transversal equalizer or have circuits that perform amplitude equalization of both I and Q signal components.

Carrier recovery 325 may comprise a phase rotator that responds to the equalized I and Q signal components from equalizer 320, a phase controller, a slicer, and an error detector which develops an error signal for use by the phase controller. For example, the phase rotator, the slicer, the error detector, and the phase controller may comprise elements of a digital phase locked loop for eliminating the dynamically varying constellation offset. Forward error correcting (FEC) module 330 may use redundant transmitted data to recover the original data for a receiver, in the event of errors introduced by noise.

Figure 3B:
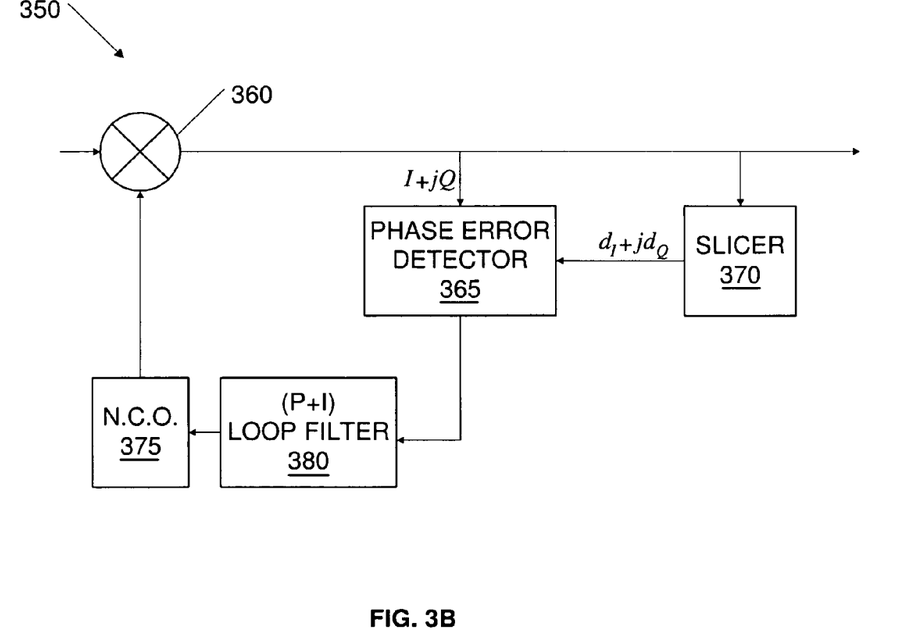
FIG. 3B illustrates the operation of a second order phase locked loop, which may be employed by numerous embodiments

Numerous embodiments may implement phase error detection via conditional probabilities for hard decisions in carrier recovery 325. Furthermore, many embodiments of demodulators may employ a combination of feed-forward and feed-back techniques to recover the carrier signal. With reference to FIG. 3B, we now move to a detailed embodiment of a phase error detector for a feedback loop.

FIG. 3B illustrates the operation of a second order phase locked loop (PLL) 350, which may be employed by numerous embodiments. For example, the elements of PLL 350 may be elements in carrier recovery 325 of FIG. 3A. The output of phase rotator 360 may be fed to a phase error detector (PED) 365. PED 365 may provide an output to a loop filter 380 that contains a proportional component and an integral component. The output of loop filter 380 may be passed to a numerically controlled oscillator (NCO) 375 that generates the complex exponential for phase rotator 360. The coefficients in the integral and proportional paths of the loop filter may be used to control the closed-loop bandwidth of the phase locked loop. One may note that while the oscillator of FIG. 3B is an NCO, which may be employed in digital system embodiments, other embodiments may comprise a voltage-controlled oscillator, such as in embodiments which are mixed analog/digital systems.

PLL 350 may be employed to track out the low frequency phase noise component of the LNB and the tuner. In many embodiments, the signal-to-noise ratio (SNR) may be relatively low. For example, the SNR may be 1.0 dB for a QPSK rate of ½ for DVB-S2. Because the SNR may be low, many embodiments may keep the loop bandwidth small. In addition to optimizing loop bandwidth, many embodiments may improve performance by improving the performance of the phase error detection elements, such as PED 365.

If PED 365 underperforms, the output packet error rate will likely be poor, the consequence of which may be unacceptable cycle slip probabilities. Therefore good demodulator performance may depend on the performance of the phase error detector in the carrier recovery loop. Phase error detectors that perform well may be characterized by high gain and low variance. Consequently, the quality of a PED may be characterized by a kind of SNR, comprising the ratio of the square of the gain to the variance at the PED output.

A digital carrier recovery system may have a decision-directed phase error detector that employs the following formula:

$$\epsilon = QC_I - IC_Q \qquad (1)$$

As depicted in FIG. 3B, (I+jQ) may comprise the input to PED 365. $C_I + jC_Q$ may comprise the decision or the constellation point nearest to received signal (I+jQ).

When the SNR is very low, many decisions may be incorrect. As a consequence, the phase error estimate provided by equation (1) may become very noisy. To reduce the noise associated with the phase error, therefore, PED 365 may use another technique to estimate or calculate phase error.

At low SNR, non-decision-aided phase error detectors may perform better. For example, a non-decision-aided phase error detector, such as a non-decision-aided phase error detector for QPSK, may employ the following:

$$\epsilon = I^3 Q - Q^3 \cdot I \quad (2)$$

Simulations may demonstrate that equation (2) may perform better than equation (1) at very low SNR.

An embodiment of PED 365 may be based on equation (1). However, the embodiment may not make the phase error only a function of the nearest constellation point, as in equation (1). As noted above, the nearest constellation point can often be the incorrect decision when the SNR is low. If PED 365 were to calculate the phase error with respect to the incorrect decision point, the calculated phase error would be incorrect. If PED 365 were to repeatedly calculate phase error using many incorrect decision points, as could be the case with low SNR, PED 365 may produce a poor output. Stated differently, if PED 365 has many incorrect estimates, the resulting variance may be high.

Instead of calculating the phase error as a function of only the nearest constellation point, an embodiment of PED 365 may calculate the phase error with reference to all the points in the constellation, not just the nearest point. In other words, PED 365 may implement equation (1) with $C_I + jC_Q$ set to every constellation point. So if there are N constellation points, such as N=4 for QPSK or N=8 for 8PSK, then there will be N phase error estimates. PED 365 may then calculate a composite phase error estimate as a weighted sum of all the N estimates. The weights may be conditional probabilities. For example, the weight for point A of the constellation is the probability that the transmitted point is A, conditional on the received signal being R, i.e. P(A/R). For comparison, one may view the conditional probability calculation as a type of maximum likelihood estimation (MLE) calculation.

One may say that computing the phase error with respect to all constellation points is computationally complex. However, equation (1) is a relatively simple equation to implement and implementing 4 or 8 of these per symbol period, for QPSK and 8PSK respectively, may not be a significant task with current technology. For example, the conditional probabilities may be read out from a relatively small look-up table. However, for embodiments where the QAM or APSK constellations may be relatively large, such as DVB-S2 with 16APSK and 32APSK constellations, then one may calculate the conditional probabilities using only constellation points in the neighborhood of the received signal. Calculating the conditional probabilities using constellation points within a certain distance may be justified by the fact of higher order constellations requiring higher SNR. With higher SNR, the conditional probabilities may decay fairly rapidly with the distance from the received point.

In a general form, PED 365 may calculate the conditional probabilities in the form given by equation (3).

$$\varepsilon = \sum_{C \in S} p(C/R)(QC_I - IC_Q) \quad (3)$$

The following definitions may apply for equation (3).
a) S may comprise the set of all constellation points used by the modulation technique. However, as pointed out earlier, for higher order modulations, one may restrict S to be a sub-set of points in the vicinity of the received signal point in order to reduce the complexity of computations.
b) R=I+jQ may represent the input to PED 365.
c) $C = C_I + jC_Q$ may represent a constellation point. C may not represent only the constellation point nearest the received signal. In fact, summation of equation (3) may be carried out over the constellation points in set S.
d) p(C/R) may represent the conditional probability that the constellation point transmitted is C, given that the received signal is R.

One may note the term $(Q C_I - I C_Q)$, present in equations (1) and (3). However, there is a difference between the term in equations (1) and (3). In equation (1), the term is computed with reference to the constellation point nearest to the received signal, in terms of Euclidean distance. In equation (3), all constellation points may be taken into account. The corresponding phase errors are then weighted by the corresponding conditional probabilities.

Note that:

$$\sum_{C \in S} p(C/R) = 1 \quad (4)$$

Hence the sum of all the weights is equal to one. The sum of all the weights equaling one validates equation (3).

Generally, it may be difficult to compute the conditional probability p(C/R). To simplify the computation, one may transform equation (3) into a form that an embodiment of a phase error detector may use. To accomplish the transformation, one may start with the Bayesian formula:

$$p(C/R) = \frac{P(R/C)P(C)}{P(R)} \quad (5)$$

Substituting equation (5) in (3) one may have:

$$\varepsilon = \sum_{C \in S} \frac{p(R/C)P(C)(QC_I - IC_Q)}{P(R)} \quad (6)$$

Assuming all constellation points are equal, in terms of likelihood of being the actual constellation point, there may be no reason why the transmitter should favor any particular constellation point. Hence one may have $P(C) = M^{-1}$, with M representing the number of points in the constellation. For example, in some embodiments M may equal 4 for QPSK, while equaling 8 for 8PSK in other embodiments.

In light of $P(C) = M^{-1}$, equation (6) turns out to be:

$$\varepsilon = (MP(R))^{-1} \sum_{C \in S} p(R/C)(QC_I - IC_Q) \quad (7)$$

Now equation (4) may be re-written as:

$$\sum_{C \in S} p(C/R) = \sum_{C \in S} \frac{p(R/C)P(C)}{P(R)} = 1 \quad (8)$$

From equation (8), one may see that:

$$\frac{P(R)}{P(C)} = MP(R) = \sum_{C \in S} p(R/C) \qquad (9)$$

Substituting equation (9) in equation (8) one may have:

$$\varepsilon = \frac{\sum_{C \in S} p(R/C)(QC_I - IC_Q)}{\sum_{C \in S} p(R/C)} \qquad (10)$$

Numerous embodiments of PED 365 may implement equation (10) to calculate the conditional probabilities for phase errors. If one assumes that additive noise has a zero-mean Gaussian probability density function with standard deviation σ, then $$p(R/C) = \frac{1}{2\sigma^2}\exp(-|C-R|^2/2\sigma^2) \qquad (11)$$

The numerator of equation (10) may represent the weighted sum of all the phase error estimates. The denominator of equation (10) may represent the sum of the weights. The function of equation (10) may serve to normalize the outputs. In a weighted addition, one may effectively take various proportions of quantities. To make the weighted addition logical, the proportions may need to add up to one. The denominator may enable the proportions to add up to one.

Implementing equation (10) for PED 365 may have numerous justifications. When the SNR is very low it may be incorrect to base the phase error on hard decisions, as in equation (1), since a significant proportion of the hard decisions may be incorrect. To avoid basing the phase error calculation on a hard decision of a single point, one may allow for the received signal to be any constellation points with mathematically correct conditional probabilities. For each constellation point, an embodiment may calculate or compute the phase error in accordance with equation (1), because equation (1) may represent the maximum likelihood that the decision is correct.

Upon calculating all of the individual phase errors for each of the constellation points, an embodiment may then calculate the sum all the phase errors, weighted by the conditional probabilities. One may note that the sum of all the weights is not equal. Adding the denominator to equation (10) may ensure that the sum of all effective weights is unity.

Figure 4:
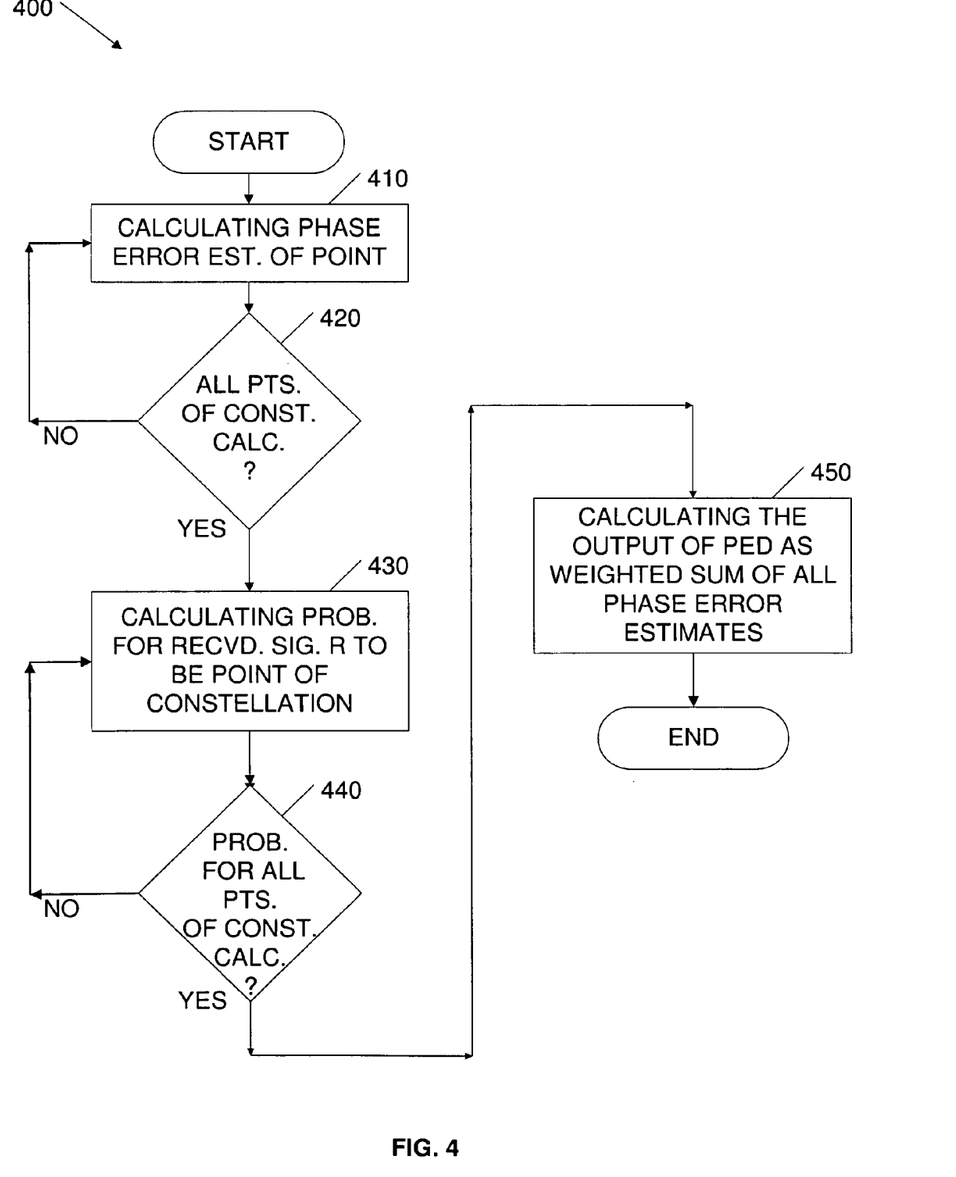
FIG. 4 illustrates a method that numerous embodiments of phase error detectors may implement to calculate the phase error via conditional probabilities

FIG. 4 illustrates a method 400 that numerous embodiments of a phase error detectors may implement to calculate the phase error via conditional probabilities. For example, an embodiment may implement the process illustrated in FIG. 4 as a computer program product stored in a tangible medium.

Given a complex-valued input R, an embodiment may calculate the phase error estimate (element 410) with reference to all the points of the constellation (elements 420 and 410). For example, a PED may use the formula $\varepsilon = Q C_I - I C_Q$ to calculate a phase error estimate for a signal point relative to each of the constellation points. In embodiments where the constellation size is relatively large, the embodiments may limit the phase error estimate calculation to only points in the vicinity of the received signal.

An embodiment may then calculate the conditional probability for the received signal to be R for a given transmitted constellation C, for all constellation points for which estimates were calculated (elements 430 and 440). As an example, for a satellite channel the main noise component may be additive Gaussian. Consequently, the conditional probability may be calculated as given by $$p(R/C) = \frac{1}{2\sigma^2}\exp(-|C-R|^2/2\sigma^2).$$

In alternative embodiments, other noise statistic calculations may be used to calculate the conditional probability.

In many embodiments, the computation of exponentials may be relatively complicated. To address the complicated computations, the values for the exponentials may be implemented using look-up tables. In many embodiments, highly precise estimates of the conditional probabilities may not be needed. The calculations from $$p(R/C) = \frac{1}{2\sigma^2}\exp(-|C-R|^2/2\sigma^2)$$

may form the weights for the weighted addition when calculating the output.

The PED may then calculate the output as the weighted sum of all the phase error estimates (element 450). Division by the sum of weights may be required in order to enable the effective weights add up to one. Calculating the output as the weighted sum of all the phase error estimates may effectively be $$\varepsilon = \frac{\sum_{C \in S} p(R/C)(QC_I - IC_Q)}{\sum_{C \in S} p(R/C)}.$$

One may note the use of the SNR when calculating the conditional probabilities. Using the SNR when calculating the conditional probabilities may not problem in DVB-S2, as the periodic header that contains known data may be extracted before carrier recovery. Depending on the embodiment, the SNR may be estimated very accurately from the periodic header. In alternative embodiments, where the SNR is not provided via a periodic header, the embodiments may nonetheless accurately estimate the SNR, especially when the SNR is low, by observing the variance of the signal after timing recovery.

Figure 5:
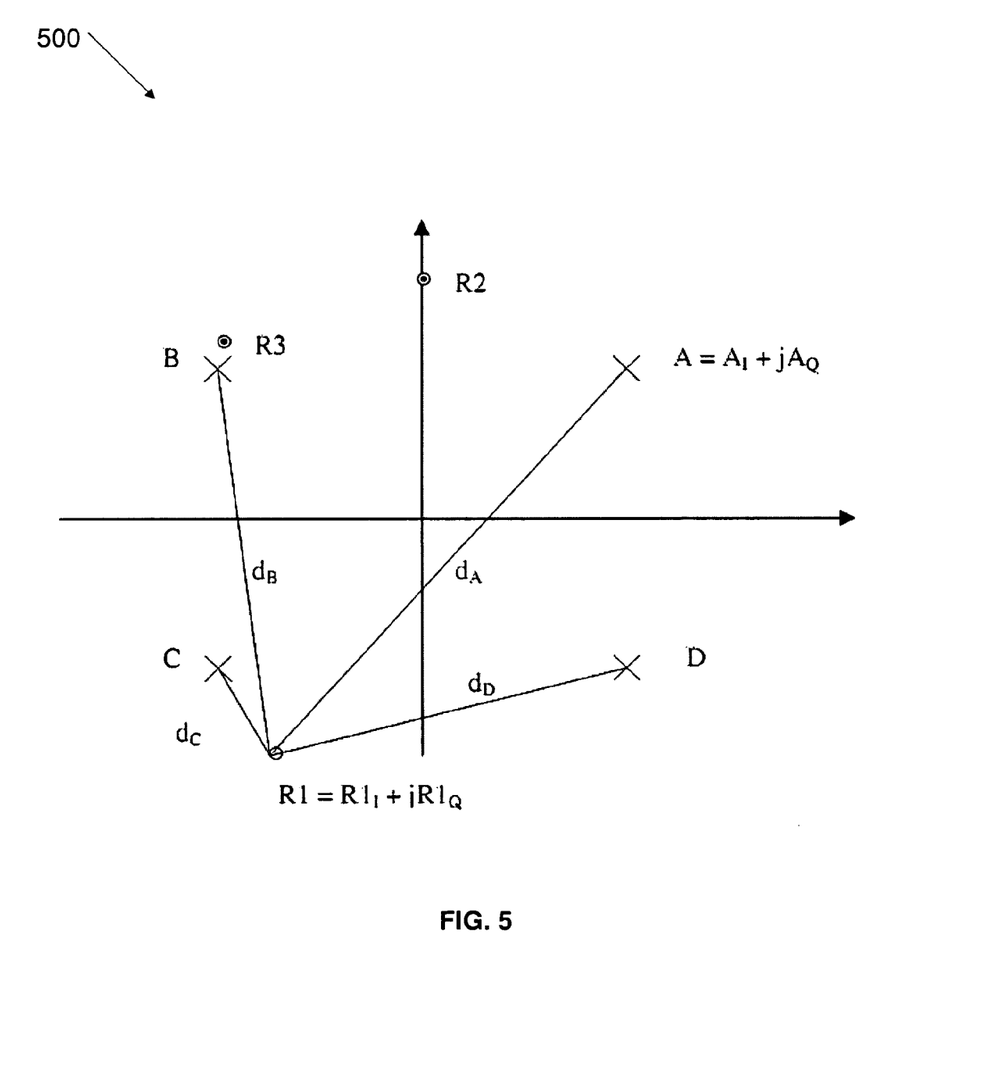
FIG. 5 depicts a graph illustrating what may be the behavior of a PED.

The graph 500 in FIG. 5 illustrates what may be the behavior of a PED according to at least one embodiment implemented for QPSK. A, B, C and D may comprise the constellation points for a QPSK system. In considering an example, if the received signal is R1, then the conditional probabilities may be functions of the distances dA, dB, dC and dD, in accordance with equation (11). For example, $$W_A = P(R1/A) = \frac{1}{2\sigma^2}\exp(-d_A/2\sigma^2) \qquad (12)$$

The four phase errors may be computed using equation (1), assuming that the decision points corresponding to the received signal R1 are A, B, C and D, respectively. For example, for point A:

$$\epsilon_A = R1_Q A_I - R1_I A_Q \tag{13}$$

The four phase errors may then be added using the conditional probabilities as the weights as given in equation (10):

$$\varepsilon = \frac{W_A \varepsilon_A + W_B \varepsilon_B + W_C \varepsilon_C + W_D \varepsilon_D}{W_A + W_B + W_C + W_D} \tag{14}$$

Now some special cases may be considered with reference to FIG. 5. Assume that the received signal is R2. Because R2 is symmetric with respect to the constellation points on the right and the left, $$P(R2/A) = P(R2/B) \tag{15}$$

$$P(R2/C) = P(R2/D))$$

With such symmetry, the phase error of equation (10) vanishes. The diminishment of the phase error may be intuitively correct, given that the received signal is symmetrically located between the constellation points, it may be impossible to define a phase error. Therefore, the most reasonable value to take may be zero.

Assuming the received signal is point R3, one may note that R3 is very close to the constellation point B. Having the received signal close to a constellation point likely means that the transmitted point actually is the close constellation point, here constellation point B. The calculation of the weights of the other three points (A, C, and D) calculate to be relatively small in comparison with to weight $W_B$. Furthermore, if the SNR is high, the three weights for A, C, and D become even smaller and may even vanish altogether for all practical purposes. As a consequence, for high SNR, the calculation for a PED embodiment may asymptotically approach the result provided by equation (1).

While the above equations were developed and discussed for QPSK, with references to 8PSK, the technique of using conditional probabilities that are weighted for the distances of the signal point to the respective constellation points may be extended to the constellations of other modulation methods. Fore example, QPSK and 8PSK are current broadcast options of DVB-S2. However, DVB-S2 also specifies 16APSK and 32APSK as modulations for interactive applications. A PED in an alternative embodiment may be extended to the 16APSK and 32APSK constellations as well and may provide significant performance gains.

As noted before, an embodiment may implement an algorithm according to equation (11) by providing values of the exponential functions via look-up tables. For 16APSK and 32APSK modulations, there are 16 and 32 terms in the summation of equation (10). This makes the computational complexity rather high. To simplify the computational complexity, an embodiment may limit the conditional probabilities to the few closest points. In other words, one may assume the conditional probabilities of relatively distant constellation points to be small enough to be neglected. Further, limiting the conditional probability calculations to the few closest points may be justified on the grounds that higher signal-to-noise ratios may generally be deemed necessary to reliably receive 16APSK and 32APSK transmissions.

Also as noted before, a PED may be characterized according to signal-to-noise ratios. SNR may be defined by:

$$SNR\_PED = \frac{PED\_Gain^2}{\sigma^2_{PED}} \tag{16}$$

For performance of a PED to be considered relatively good, the gain of the phase error may need to be high and the variance of phase jitter may need to be low. Hence, the SNR provided by equation 16 may be a good way to characterize the performance of a PED. In a final analysis, the performance of a demodulator PED may be characterized with reference to the low-density parity-check (LDPC) frame error rate. However, calculating different SNR values may be easier than actual simulations, as simulations that include LDPC may take extended periods of time.

In a simulation, the (denominator) variance at the PED output may be calculated knowing the actual transmitted bits, actual noise added, and the actual phase noise. The results depicted in table 600 of FIG. 6 were obtained for three phase error detectors corresponding to equations (1), (2) and (10). Table 600 shows that an embodiment of a PED according to equation 10 has the best SNR of the three. Simulations including the LDPC decoder also reflect similar SNR gains as the gains depicted in table 600.

Subsequent simulations may be carried out by cascading the carrier recovery loop containing an embodiment of a PED and the LDPC decoder. Systems that use equation (10) may give the best performances.

Figure 6:
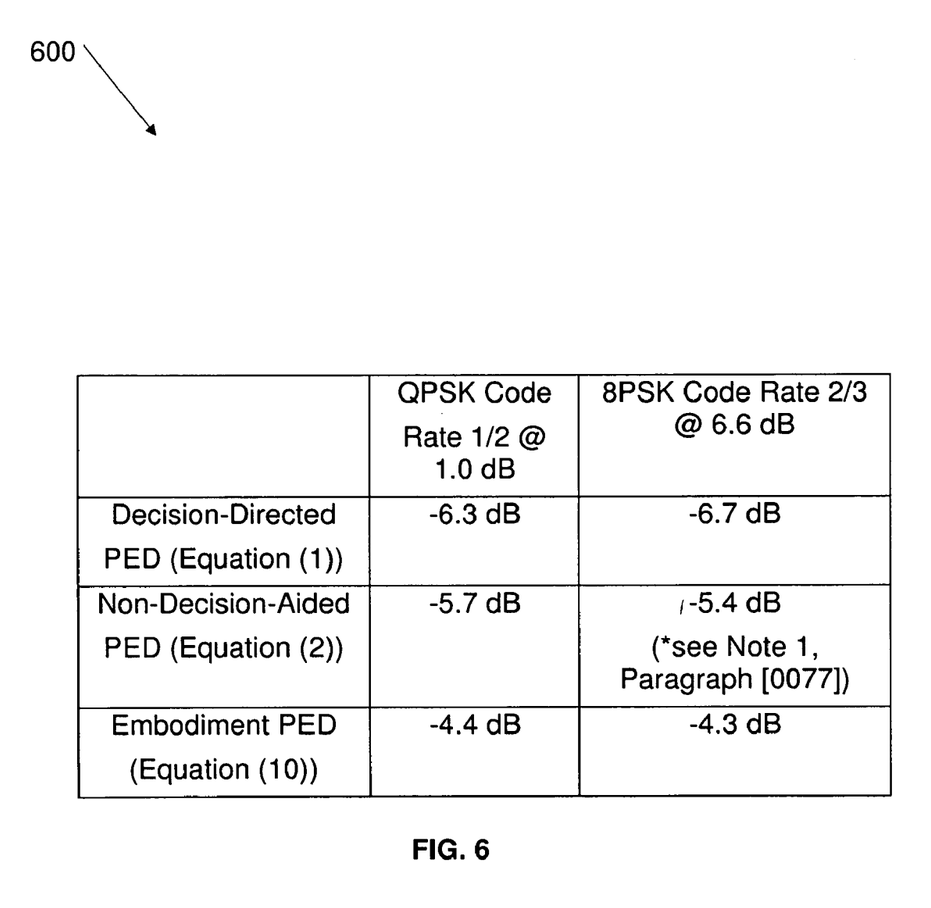
FIG. 6 shows the results of three phase error detectors.

*Note 1: The Non-Decision-Aided (NDA) algorithm of equation (2) does not work for 8PSK. Consequently, the same theory used for generating equation (2) has been employed for an NDA algorithm for 8PSK.

Figure 7:
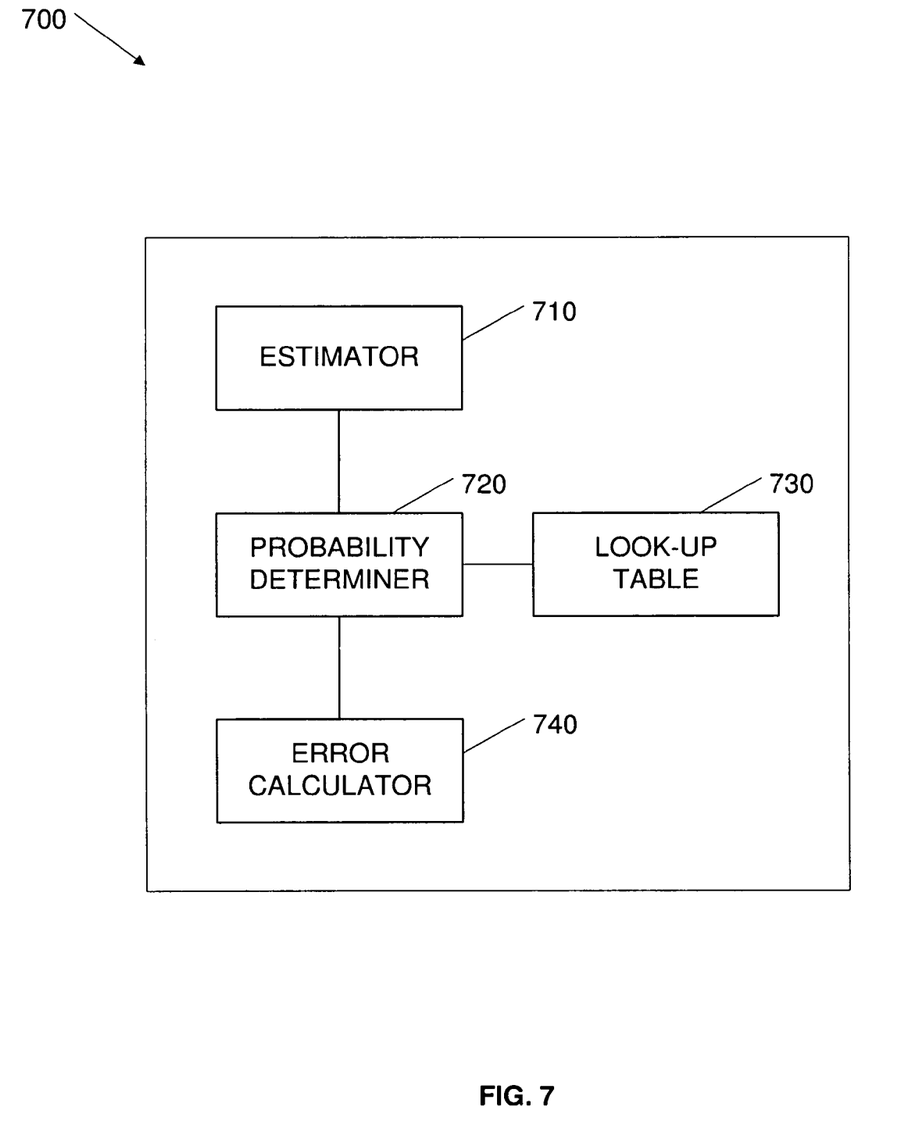
FIG. 7 depicts an apparatus that may detect phase errors via conditional probabilities.

FIG. 7 depicts one embodiment of an apparatus 700 that may detect phase errors via conditional probabilities. One or more elements of apparatus 700 may be in the form of hardware, software, or a combination of both hardware and software. For example, in the embodiment depicted in FIG. 7, the elements of apparatus 700 may exist as instruction-coded modules stored in a memory device. For example, the modules may comprise software or firmware instructions of an application to compute phase error via conditional probabilities, executed by receiver 200 in FIG. 2. In other words, apparatus 700 may comprise elements of a communications receiving device that employs a processor and instructions to calculate and/or correct phase errors.

Estimator 710 may calculate estimates of phase error for numerous points of a constellation. For example with reference to FIG. 5, apparatus 700 may receive a QPSK input signal "R1". Estimator 710 may calculate four individual estimates of phase error relative to points A, B, C, and D. Stated differently, given "R1", estimator 710 may employ equation (1) to calculate four individual estimates of phase error for each of the points.

Probability determiner 720, which may work in conjunction with estimator 710, may calculate weights of conditional probabilities for the input signal relative to individual points of a constellation. Continuing with our example of FIG. 5, probability determiner 720 may calculate four weights of conditional probabilities for input signal "R1" relative to points A, B, C, and D. Each weight may be calculated using, e.g., equation (11).

Computation exponentials may be relatively complicated. To calculate the exponentials of equation (11), probability determiner 720 may access look-up table 730. For example, look-up table 730 may store a number of values and a number of exponentials corresponding to the values. For a given calculation, probability determiner 720 may select an exponential from the table corresponding to the value closest to the value of the calculation. In alternative embodiments, probability determiner 720 may derive a more accurate exponential number by, e.g., using two values of look-up table 730 and interpolating.

Error calculator 740 may determine a composite error of phase based on the individual estimates of phase error of estimator 710 and the individual weights of conditional probabilities from probability determiner 720. Continuing with our example of FIG. 5, error calculator 740 may calculate a composite error according to equation (10), using the calculations or results of estimator 710 and probability determiner 720. A system that comprises apparatus 700 may receive the calculated composite error and use the composite error to adjust or manipulate the received input signal, such as via a phase rotator.

In different embodiments the number of modules or elements of apparatus 700 may vary. Some embodiments may have fewer elements than those depicted in FIG. 7. For example, one embodiment may integrate the functions described and/or performed by estimator 710 with the functions of probability determiner 720 into a single module. Alternative embodiments may also not have all of the modules depicted in FIG. 7. For example, numerous embodiments may not have look-up table 730.

Further embodiments may include more modules or elements than the ones shown in FIG. 7. For example, alternative embodiments may include two or more estimators 710 and two or more probability determiners 720. Each estimator and each probability determiner may be employed to, e.g., simultaneously perform the calculations associated with each individual point of a constellation. As a more specific illustration using our previous example of FIG. 5, an alternative embodiment of apparatus 700 may employ four estimators and four probability determiners to perform the calculations for the four points A, B, C, and D.

In various embodiments, one or more of the elements of apparatus 700 may comprise hardware-only modules. For example, one or more elements of apparatus 700 may comprise an analog computing circuit formed in one or more integrated circuits. Alternatively, instead of analog computing circuits, one or more elements may comprise a hardware state machine arranged to perform calculations. Some alternative embodiments may employ a combination of analog circuits and digital circuits for one or more of the elements of apparatus 700.

In many embodiments, the elements of apparatus 700 may reside a single device, such as a single integrated circuit or a single dynamic random access memory (DRAM) stick. In other embodiments, the elements of apparatus 700 may reside in more than one device. For example, one or more elements of apparatus 700 may be spread among multiple integrated circuit chips in a receiver system.

In further alternative embodiments, one or more of the elements of apparatus 700 may comprise a combination of hardware and software modules. For example, the elements of apparatus 700 may be implemented in an ASIC and inserted into a communications receiver. For a more specific illustration, apparatus 700 may comprise an ASIC situated between tuner 208 and D/A converter 212, shown in receiver 200 of FIG. 2.

Another embodiment is implemented as a program product for implementing systems, methods, and apparatuses described with reference to FIGS. 1-4 and 7. The embodiment may be implemented in software, which includes but is not limited to firmware, resident software, microcode, etc.

Furthermore, embodiments may take the form of a computer program product accessible from a computer-usable or computer-readable medium providing program code for use by or in connection with a computer or any instruction execution system. For the purpose of describing the various embodiments, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

It will be apparent to those skilled in the art having the benefit of this disclosure that the embodiments herein contemplate methods, apparatuses, and systems which employ conditional probabilities to calculate phase errors. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
calculating a plurality of estimates of phase error for an input signal, wherein the plurality of estimates are for a constellation of points used by a modulation technique;
calculating a plurality of weights of conditional probabilities that correspond to the estimates of phase error;
multiplying individual estimates of phase error with individual weights to produce a plurality of weighted estimates; and
dividing a first sum of the plurality of weighted estimates by a second sum of the plurality of weights to determine a composite estimate of phase error.

2. The method of claim 1, further comprising receiving a transmitted signal at a tuner to generate the input signal, wherein the input signal comprises an "I" component and a "Q" component.

3. The method of claim 1, further comprising filtering the composite estimate of phase error via a loop filter, wherein the loop filter comprises a proportional component and an integral component.

4. The method of claim 3, further comprising controlling the closed-loop bandwidth of a phase locked loop via a phase rotator and a complex exponential, wherein the complex exponential is from an oscillator coupled to the loop filter.

5. The method of claim 4, wherein the calculating the plurality of estimates of phase error comprise solving $\epsilon = Q\,C_I - I\,C_Q$ for at least two points of the constellation of points, wherein further (I+jQ) comprises the input signal, wherein further $C_I + jC_Q$ comprises a point of the constellation of points.

6. The method of claim 5, wherein the calculating the plurality of weights of conditional probabilities comprises solving $$p(R/C) = \frac{1}{2\sigma^2}\exp(-|C - R|^2/2\sigma^2)$$

for the at least two points.

7. The method of claim 6, wherein the dividing the first sum of the plurality of weighted estimates by the second sum of the plurality of weights comprises solving $$\varepsilon = \frac{W_A \varepsilon_A + W_B \varepsilon_B + W_C \varepsilon_C + W_D \varepsilon_D}{W_A + W_B + W_C + W_D},$$

wherein $W_A$, $W_B$, $W_C$, and $W_D$, comprise the calculated weights of conditional probabilities of constellation points A, B, C, and D, respectively, and $\epsilon_A$, $\epsilon_B$, $\epsilon_C$, and $\epsilon_D$, comprise the calculated estimates of phase error referenced to constellation points A, B, C, and D, respectively, wherein further the constellation points are quaternary phase shift keying (QPSK) constellation points.

8. An apparatus, comprising:
an estimator to determine estimates of phase error for an input signal, wherein the estimates are referenced to a constellation of points used by a modulation technique;
a probability determiner to determine weights of probabilities for the estimates of phase error; and
an error calculator to calculate a composite error of phase for the input signal based on the estimates of phase error and the weights of probabilities, wherein the composite error comprises a quotient of a numerator and a denominator, wherein further the numerator comprises a first sum of products of the estimates of phase error and the weights of probabilities, wherein further the denominator comprises a second sum of the weights of probabilities.

9. The apparatus of claim 8, wherein the estimator is configured to determine an estimate of a point by calculating $\epsilon = Q\,C_I - I\,C_Q$, wherein $\epsilon$ comprises the estimate, (I+jQ) comprises the input signal, and $C_I + jC_Q$ comprises the point of the constellation of points.

10. The apparatus of claim 8, wherein the probability determiner is configured to calculate $$p(R/C) = \frac{1}{2\sigma^2}\exp(-|C - R|^2/2\sigma^2),$$

wherein p comprises a weight of probability for a point, C, of the constellation of points and R comprises the input signal.

11. The apparatus of claim 10, wherein the probability determiner is configured to determine the exponential function via a look-up table.

12. The apparatus of claim 10, wherein the error calculator is configured to extract a signal-to-noise ratio (SNR) from data of the input signal and use the SNR to calculate the composite error.

13. The apparatus of claim 8, wherein the error calculator is configured to calculate the composite error via only four points of the constellation, wherein further the four points are the closest four points to the signal input for a 32-phase asymmetric phase shift keying (APSK) constellation.

14. The apparatus of claim 8, wherein the error calculator is configured to calculate the composite error, $\epsilon$, by solving $$\varepsilon = \frac{\sum_{C \in S} p(R/C)(QC_I - IC_Q)}{\sum_{C \in S} p(R/C)}.$$

15. A system, comprising:
a tuner to generate in-phase ("I") and quadrature-phase ("Q") components of an input signal;
a demodulator to demodulate the modulated input signal; and
a phase error detector to detect a composite error of phase of the input signal with reference to a constellation of points used by a modulation technique, wherein the composite error comprises a quotient of a numerator and a denominator, wherein further the numerator comprises a first sum of products of estimates of phase error and weights of probabilities associated with the estimates, wherein further the denominator comprises a second sum of the weights of probabilities.

16. The system of claim 15, further comprising a central processing unit, memory, and an access card interface, wherein the phase error detector is a component of the demodulator, wherein further the phase error detector is arranged to correct the phase error via the composite error and a phase rotator.

17. The system of claim 15, wherein the phase error detector is configured to calculate the composite error by calculating $\epsilon = Q\,C_I - I\,C_Q$, wherein $\epsilon$ comprises an estimate relative to a point of the constellation, (I+jQ) comprises the input signal, and $C_I + jC_Q$ comprises the point of the constellation of points.

18. The system of claim 15, wherein the phase error detector is configured to compute the composite error by computing $$\varepsilon = \frac{\sum_{C \in S} p(R/C)(QC_I - IC_Q)}{\sum_{C \in S} p(R/C)},$$

wherein $\epsilon$ comprises the composite error, p comprises a weight of probability for a point, C, of the constellation, and R comprises the input signal.

19. The system of claim 15, further comprising a central processing unit, memory, and an access card interface, wherein the phase error detector is a component of the demodulator, wherein further the phase error detector is arranged to correct the phase error via the composite error and a phase rotator.

20. The system of claim 15, wherein the tuner is configured to generate the in-phase and quadrature-phase components from a microwave signal, wherein further the system comprises a mobile device.

21. The system of claim 15, wherein the constellation of points comprises exactly four points of at least one of an 8-phase phase shift keying (8PSK) constellation, a quadrature amplitude modulation (QAM) constellation, and a 32-QPSK constellation.

22. A tangible machine-readable storage medium, wherein the storage medium does not comprise a transitory signal, the storage medium containing instructions, which when executed by a machine, cause said machine to perform operations, comprising:

computing a plurality of estimates of phase error for an input signal, wherein the plurality of estimates is for a constellation of points used by a modulation technique;

computing a plurality of weights of conditional probabilities that correspond to the estimates of phase error;

multiplying individual estimates of phase error with individual weights to produce a plurality of weighted estimates; and dividing the plurality of weighted estimates by a sum of the plurality of weights to determine a composite estimate of phase error.

23. The tangible machine-readable storage medium of claim 22, wherein computing the plurality of estimates of phase error comprise solving $\epsilon = Q C_I - I C_Q$ for each point of the constellation, wherein further $\epsilon$ comprises an estimate relative to a point of the constellation, (I+jQ) comprises the input signal, and $C_I + jC_Q$ comprises the point of the constellation of points.

24. The tangible machine-readable storage medium of claim 22, wherein computing the plurality of weights comprises solving $$p(R/C) = \frac{1}{2\sigma^2}\exp(-|C-R|^2/2\sigma^2),$$

wherein p comprises a weight of probability for a point, C, of the constellation and R comprises the input signal.

25. The tangible machine-readable storage medium of claim 22, wherein the constellation of points comprises a phase shift keying (PSK) constellation of at least four phases.

* * * * *